METHOD OF MAKING ANHYDROUS MAGNESIUM CHLORIDE

Filed July 31, 1920

Inventors
Paul Cottringer and
William R. Collings.
By Day, Oberlin & Day
Attorneys Patented Apr. 10, 1923.

1,450,912

UNITED STATES PATENT OFFICE.

PAUL COTTRINGER AND WILLIAM R. COLLINGS, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING ANHYDROUS MAGNESIUM CHLORIDE.

Application filed July 31, 1920. Serial No. 400,444.

*To all whom it may concern:*

Be it known that we, PAUL COTTRINGER and WILLIAM R. COLLINGS, citizens of the United States, and residents of Midland, county of Midland, and State of Michigan, have invented a new and useful Improvement in Methods of Making Anhydrous Magnesium Chloride, of which the following is a specification, the principle of the invention being herein explained and the best mode in which we have contemplated applying that principle, so as to distinguish it from other inventions.

Heretofore, so far as we are aware, in order to obtain anhydrous magnesium chloride, it has been necessary to dehydrate the normal salt which, as is well known, crystallizes out with six molecules of water ($MgCl_2 6H_2O$). Considerable difficulty, however, is encountered in dehydrating this salt, the best known methods involving either the evaporation of a solution of such chloride in a current of hydrochloric acid gas, or the formation of the double magnesium ammonium salt and then evaporating the latter to dryness, carefully heating and finally igniting.

In contradistinction to the foregoing we have made the invention or discovery that anhydrous magnesium chloride may be prepared directly by reacting between magnesium oxide or hydroxide, and hydrochloric acid gas under suitable conditions.

To the accomplishment of the foregoing and related ends, the invention, then, consists of the steps hereinafter fully described and particularly pointed out in the claims, the annexed drawing and the following description setting forth in detail certain means and one mode for carrying out the invention, such disclosed means and mode, however, being merely illustrative of the various ways in which the principle of the invention may be used.

In said annexed drawing:—

Figure 1:
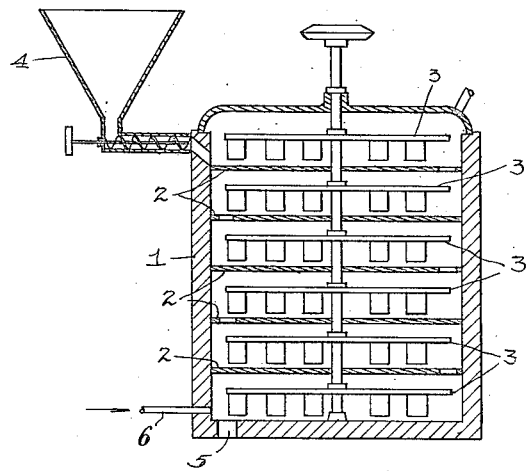
Figure 2:
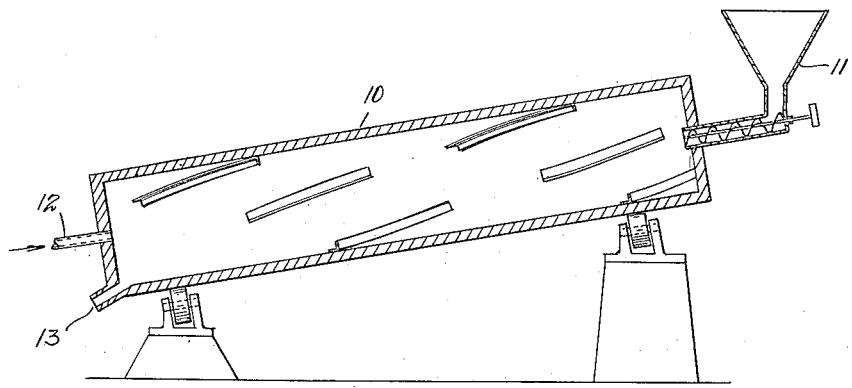

Fig. 1 is a diagrammatic side elevation of one form of apparatus, specifically of the shelf dryer type, for carrying on our present improved method; and Fig. 2 is a similar elevation of another form of apparatus of the rotary kiln type that is suitable for the purpose stated.

As previously indicated, the present improved process is based on the direct reaction between hydrochloric acid and magnesium oxide ($MgO$) or the hydrated form thereof ($Mg(OH)_2$). For the purpose of inducing and maintaining such reaction it is necessary that the hydrochloric acid be in gas form and more or less dry and that the magnesium oxide or hydroxide be likewise substantially dry. The two materials in question furthermore require to be brought together and held at an elevated temperature, i. e. in excess of 700° Fahrenheit, a temperature between 800 and 1000° Fahrenheit having been found satisfactory in practice.

It facilitates the reaction if the magnesium oxide or hydroxide in dry powder form be disseminated in a stream of the hydrochloric acid gas, and this is the object sought to be accomplished in the two illustrative forms of apparatus shown in the drawing. Thus in Fig. 1 there is shown a furnace chamber 1 with a series of shelves 2 arranged therein and with stirring devices 3 co-operative with such shelves respectively just as in an ordinary shelf dryer. The dry magnesium oxide or hydroxide is fed into the upper shelf 2 in the chamber by means of a suitable feeding device 4, and thence gradually descends from shelf to shelf until it is discharged through opening 5. Simultaneously a stream of hydrochloric acid gas is admitted at the bottom of the chamber through an opening 6 and is caused to flow in a reverse direction to the path of travel of the magnesium oxide or hydroxide, the latter due to its dry state and the stirring action of the arms 3 being more or less thoroughly disseminated in such stream of gas. In the alternative form of apparatus illustrated in Fig. 2 we show a rotary type drum or kiln 10 inclined at a suitable angle and arranged to be heated either interiorly or exteriorly to the previously indicated temperature. Preferably such heat is applied at the lower end, which is thus the hottest, the temperature within the drum being lowest at the upper end where the magnesium oxide or hydroxide is introduced through a suitable feeding device 11. The hydrochloric acid gas is introduced at the lower end of the kiln through a suitable opening 12 and thence passes through the drum in a reverse direction to that of the magnesium compound. A suitable discharge duct 13 is provided, through which the finished product escapes at the lower end of the drum. In this type of apparatus the magnesium compound it will be observed passes through a zone of increasing temperature and the drying operation may be wholly or partly accomplished in the single apparatus by making the drum of sufficient length. The current of hydrochloric acid gas which passes through the drum in the opposite direction encounters a thoroughly dried and highly heated magnesium oxide at the hottest end of the apparatus, the hydroxide if used being of course dehydrated by the time it reaches this point, thus ensuring the complete conversion of the latter to the desired anhydrous chloride. The residual hydrochloric acid gas will be absorbed by the freshly admitted oxide or hydroxide at the upper end of the drum.

The advantages of the present improved process over those heretofore employed will be obvious. There is no need for carefully regulated stage control as where the chloride is evaporated, while the handling of the hydrochloric acid gas is no more objectionable in the present connection than in such familiar evaporating processes where it is used in the final step, as previously explained.

In either of the types of apparatus shown in the drawing, the dry hydrochloric acid gas, as well as the dry magnesium oxide, may be passed through the apparatus in a closed circuit, the circulation being maintained until practically all of such oxide or hydroxide has been converted to the desired anhydrous magnesium chloride. In such case it will be desirable to provide some drying agent such as sulphuric acid for removing the moisture from the partially depleted gas as it leaves the chamber or drum in which the reaction is taking place. The essential requirement in the operation is that the temperature be held at some point over 700 degrees Fahrenheit at the point where the gas and material come in contact with each other.

It will be understood that the term magnesium oxide, as used herein, is to be construed as including the hydrated form where, under the conditions existing in certain stages of the operation, such oxide may temporarily exist in this form.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method of making anhydrous magnesium chloride which consists in causing a reaction between magnesium oxide and hydrochloric acid gas, substantially as described.

2. The method of making anhydrous magnesium chloride which consists in causing a reaction at an elevated temperature between dry magnesium oxide and dry hydrochloric acid gas.

3. The method of making anhydrous magnesium chloride which consists in causing a reaction at a temperature from 800° to 1000° Fahrenheit between dry magnesium oxide and dry hydrochloric acid gas.

4. In a method of making anhydrous magnesium chloride, the step which consists in disseminating dry, powdered magnesium oxide in a stream of dry hydrochloric acid gas at an elevated temperature.

5. In a method of making anhydrous magnesium chloride, the step which consists in disseminating dry, powdered, magnesium oxide in a stream of dry hydrochloric acid gas at a temperature from 800° to 1000° F.

6. In a method of making anhydrous magnesium chloride, the steps which consist in passing magnesium oxide through a zone of elevated temperature and simultaneously passing a stream of hydrochloric acid gas in the opposite direction.

7. In a method of making anhydrous magnesium chloride, the steps which consist in passing magnesium oxide through a zone of increasing temperature, and simultaneously passing a current of hydrochloric acid gas in the opposite direction.

8. In a method of making anhydrous magnesium chloride, the steps which consist in passing magnesium oxide through a zone increasing in temperature to from 800° to 1000° F. and simultaneously passing a current of hydrochloric acid gas in the opposite direction.

9. In a method of making anhydrous magnesium chloride, the steps which consist in passing magnesium oxide through a zone of elevated temperature, simultaneously passing a stream of hydrochloric acid gas in the opposite direction, and agitating such oxide or hydroxide the while so as to disseminate the same in such stream of gas.

Signed by us, this 24th day of July, 1920.

PAUL COTTRINGER.
WILLIAM R. COLLINGS.